US007006325B2

(12) United States Patent
Emberty et al.

(10) Patent No.: US 7,006,325 B2
(45) Date of Patent: *Feb. 28, 2006

(54) AUTOMATED HANDLING AND INTERFACE MECHANISM FOR LIBRARY OF DISK DRIVE CARRIERS

(75) Inventors: Robert George Emberty, Tucson, AZ (US); Craig Anthony Klein, Tucson, AZ (US); Samuel Irwin Lewis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 753 days.

This patent is subject to a terminal disclaimer.

(21) Appl. No.: 09/898,886

(22) Filed: Jul. 3, 2001

(65) Prior Publication Data

US 2003/0007285 A1    Jan. 9, 2003

(51) Int. Cl.
*G11B 15/15* (2006.01)
(52) U.S. Cl. .................................... 360/98.06
(58) Field of Classification Search ............. 360/98.06, 360/92; 369/30.45, 30.4; 414/280
See application file for complete search history.

(56) References Cited

U.S. PATENT DOCUMENTS

| 5,502,811 | A |  | 3/1996 | Ripberger |
| 5,687,039 | A |  | 11/1997 | Coffin et al. |
| 5,764,615 | A | * | 6/1998 | Ware et al. ............... 369/30.57 |
| 5,831,525 | A | * | 11/1998 | Harvey ........................ 340/507 |
| 6,438,623 | B1 | * | 8/2002 | Ryan .............................. 710/2 |
| 6,464,509 | B1 | * | 10/2002 | Emberty et al. ............... 439/39 |
| 6,826,004 | B1 | * | 11/2004 | Albrecht et al. .............. 360/69 |

FOREIGN PATENT DOCUMENTS

JP             06068565 A    *    3/1994

OTHER PUBLICATIONS

"Optical Data Storage Library For Disks Without Cartridges Shell," IBM Technical Disclosure Bulletin, vol. 37, No. 028, Feb. 1994.

* cited by examiner

*Primary Examiner*—George J. Letscher
*Assistant Examiner*—Christopher R. Magee
(74) *Attorney, Agent, or Firm*—John C. Kennel; Dillon & Yudell LLP

(57) ABSTRACT

A picking tool for an automated library of disk drive carriers has a body with a large guide pin, and a pair of electromagnets. The guide pin has an optical service interface at its tip. A disk drive is mounted to a carrier having a front bezel with a tapered hole that is complementary to the guide pin. The hole provides access to an optical service interface linked to the disk drive. The bezel also has a pair of embedded magnets located adjacent to its front surface. The carrier is located in and interconnected with a slot in an automated disk drive library. The guide pin is inserted into the hole so that the interfaces interconnect. The carrier is removed from the slot by activating the electromagnets on the picking tool to attract the magnets in the bezel. The tool picker then pulls the carrier out of the slot while supporting the weight of the carrier on the guide pin. The carrier is released from the picking tool by reversing the current through the electromagnets to repel the magnets in the carrier. The guide pin is then smoothly withdrawn from the hole by backing the picking tool away from the carrier.

11 Claims, 2 Drawing Sheets

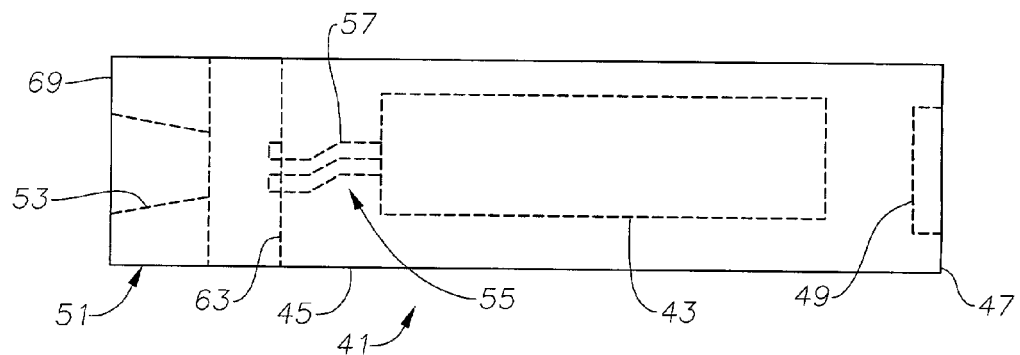
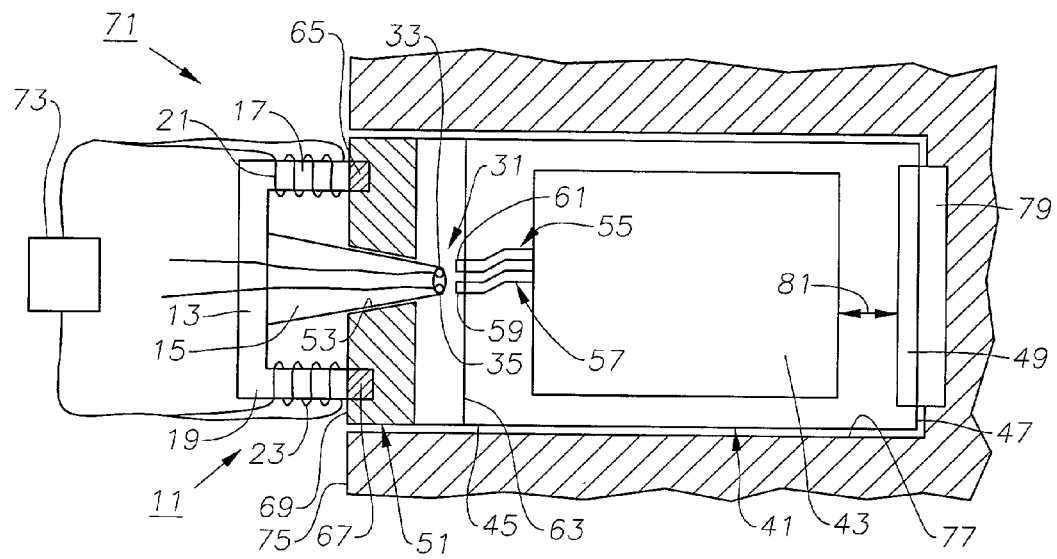

AUTOMATED HANDLING AND INTERFACE MECHANISM FOR LIBRARY OF DISK DRIVE CARRIERS

BACKGROUND OF THE INVENTION

1. Technical Field

The present invention relates in general to improved handling of disk drive carriers, and in particular to a device for interfacing with and handling disk drive carriers in an automated library.

2. Description of the Related Art

Automated data storage device libraries that utilize media devices such as tape cartridges are known in the art. A large number of the storage devices are typically mounted in slots containing an interface for communicating with the storage device. The interfaces are usually located at the back of the slots and are inaccessible from the front once the storage device is installed in the slot. If an interface becomes faulty or fails, the storage device and library are unable to communicate. The storage device must then be pulled from the slot and replaced with another. Moreover, if the storage device is faulty, the storage device cannot be diagnosed until it is removed. In addition, storage device picking mechanisms typically require a significant amount of time to align with, engage, and remove a storage device from a slot. This sequence of events is normally a slower operation than a slot-to-slot transport of a storage device within the library. Finally, the possibility of dropping storage devices while handling them in this manner is always present. Thus, an improved device for interfacing with and handling storage devices in an automated library is needed.

SUMMARY OF THE INVENTION

A picking tool for an automated library of disk drive carriers has a body with a large guide pin and a pair of electromagnets, all extending from the body in the same direction. The guide pin has an optical service interface at its tip. A disk drive is mounted to a carrier having a front bezel with a tapered hole that is complementary to the guide pin. The hole provides access to an optical service interface linked to the disk drive. The bezel also has a pair of embedded magnets located adjacent to its front surface.

The carrier is located in and interconnected with a slot in an automated disk drive library. The picking tool is mounted to a positioning mechanism for selectively engaging and interfacing with the disk drive in the carrier. The guide pin is inserted into the hole so that the interfaces optically interconnect, and data is exchanged between the disk drive and the library. The carrier is removed from the slot by activating the electromagnets on the picking tool to attract the magnets in the bezel. The tool picker then pulls the carrier out of the slot while supporting the weight of the carrier on the guide pin. After the picking tool arrives at the desired location, the carrier is released from the picking tool by reversing the current through the electromagnets to repel the magnets in the carrier. The guide pin is then smoothly withdrawn from the hole by backing the picking tool away from the carrier.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 3 is a sectional side view of the disk drive carrier of FIG. 2.

FIG. 4 is a sectional top view of the picker tool of FIG. 1 engaged with the disk drive carrier of FIG. 2 in an automated disk drive library.

DETAILED DESCRIPTION OF THE PREFERRED EMBODIMENT

Figure 1:
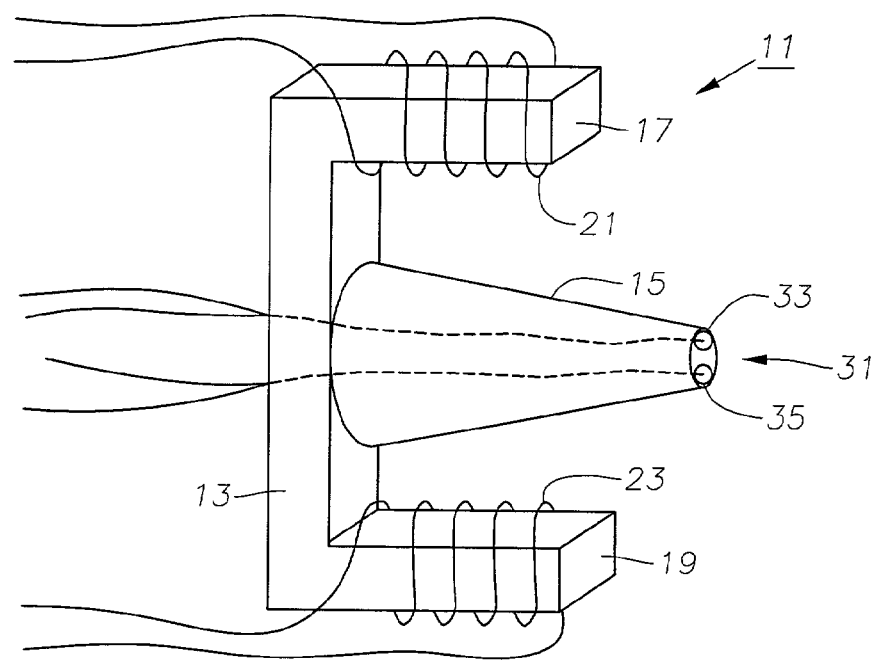
FIG. 1 is an isometric view of one embodiment of a picker tool for disk drive carriers constructed in accordance with the present invention.

Referring to FIG. 1, a picking tool 11 for an automated library of disk drive carriers is shown. Picking tool 11 has securing means in the form of an electromagnetic body 13, and an interface means in the form of a rigid guide pin 15 protruding from body 13. Body 13 is a generally C-shaped element that is formed from a ferrous material. A pair of electromagnets 17, 19 extend from body 13 in the same direction as guide pin 15. In the embodiment shown, electromagnets 17, 19 are slightly shorter in length than guide pin 15. Electromagnets 17, 19 are provided with electric coils 21, 23, respectively, for inducing magnetic fields. As will be described in further detail below, reversible current supplied through electric coils 21, 23 provides magnetic attraction when picking a disk drive carrier from a drawer, and magnetic repulsion when placing the disk drive carrier in the drawer.

Guide pin 15 is formed from a non-ferrous material such as aluminum and may comprise a variety of shapes, but is generally conical in the version shown. In the preferred embodiment, guide pin 15 is provided with an optical service interface 31 at its distal end, and is approximately 1 inch in diameter at its base or proximal end. Optical service interface 31 comprises an LED 33 and a phototransistor 35 for coupling with complementary devices in the disk drive carriers. Other types of interfaces also may be used, depending upon the application.

Figure 2:
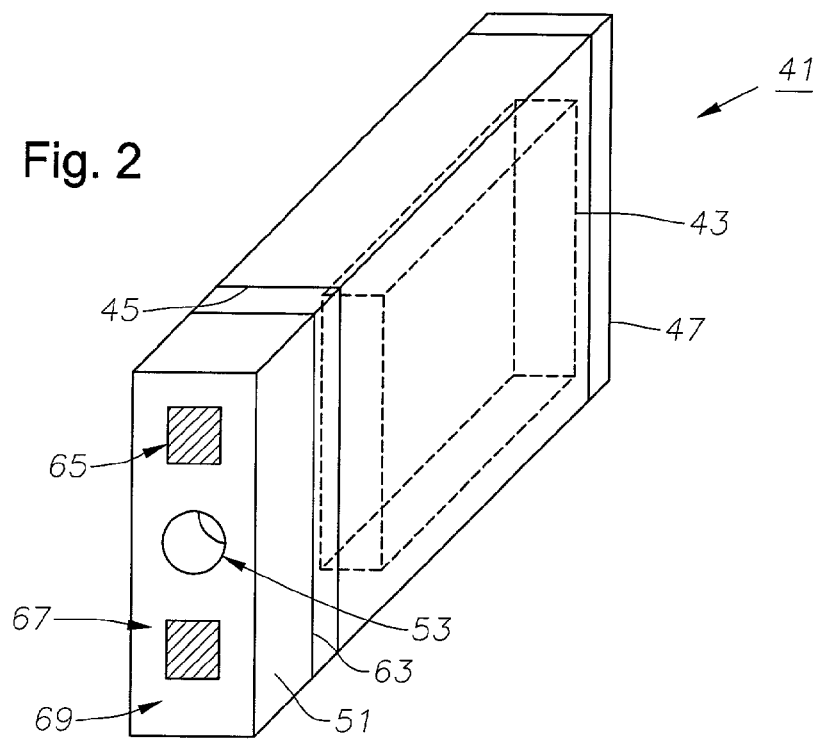
FIG. 2 is an isometric view of a disk drive carrier for the picker tool of FIG. 1 and is constructed in accordance with the present invention.

Referring now to FIGS. 2–4, a disk drive tray or carrier 41 constructed in accordance with the present invention is shown. Carrier 41 supports a disk drive 43 in a unitary drive assembly as shown. Disk drive 43 may be hermetically sealed for protection and portability. Carrier 41 is generally rectangular in shape having a front end 45 and a rearward end 47 with a backplane connector 49. A front bezel 51 is mounted to front end 45 and has a tapered hole 53 that is complementary to guide pin 15. Hole 53 provides access to an optical service interface 55 on a small printed circuit board (not shown) located behind bezel 51. Preferably, optical service interface 55 comprises a flexible cable 57 having an LED 59 and a phototransistor 61. The printed circuit board is electrically connected with an RS232 TTL interface that is available on the disk drive 43 option block. Bezel 51 also has a pair of embedded magnets 65, 67 located adjacent to its front surface 69. Copper shielding 63 extends between disk drive 43 and bezel 51 as an EMI shield for disk drive 43.

In operation (FIG. 4), picking tool 11 and a plurality of disk drive carriers 41 (one shown) are designed to be utilized in a system, such as an automated disk drive library 71 having a computer or controller 73. Interface 31 on picking tool 11 is connected to the service processor of controller 73. Each disk drive carrier 41 is mounted in a rack 75 having a plurality of slots or drawers 77. Drawer 77 has a connector 79 for engaging backplane connector 49 on carrier 41.

Picking tool 11 is mounted to a positioning means such as a robotic arm (not shown) for selectively engaging and interfacing with disk drive 43 in carrier 41. After the positioning means properly aligns picking tool 11 with a desired carrier 41, guide pin 15 is inserted into hole 53 in bezel 51. The optical service interfaces 31, 55 optically interconnect when LED 33 and phototransistor 35 are in close proximity to phototransistor 61 and LED 59, respectively. With this interconnection, data or information is exchanged between controller 73 and disk drive 43 in the accessed carrier 41, regardless of the status of the connection between disk drive 43, connector 49 of carrier 41, and connector 79 in drawer 77. Thus, drive 43 may be analyzed or diagnosed by controller 73 via picking tool 11 even if the backplane data connection of drive 43 is faulty or failing, as long as drive 43 is powered.

To remove carrier 41 from drawer 77, controller 73 activates electromagnets 17, 19 to attract magnets 65, 67, respectively. Since tapered guide pin 15 is closely received by the tapered hole 53 in bezel 51, picker tool 11 can firmly and precisely withdraw carrier 41 and move it to another location. Guide pin 15 supports the majority of the side loads that picker tool 11 is subjected to while carriers 41 are being moved from slot to slot within library 71. In other words, electromagnets 17, 19 provide horizontal support for carrier 41, and guide pin 15 provides vertical support for carrier 41. The electromagnetic poles of picking tool 11 only have to hold in the plane of inserting and extracting a carrier 41 relative to a drawer 77 (see arrows 81 on right side of FIG. 4), which is normally a slower operation than a slot-to-slot transport of a carrier 41 within the library 71. This configuration lessens the possibility of a carrier 41 being dropped by picking tool 11. After picking tool 11 arrives at the desired location and carrier 41 is aligned with and inserted into a drawer 77, controller 73 releases carrier 41 from picking tool 11 by reversing the current through coils 21, 23, such that electromagnets 17, 19 on picking tool 11 repel magnets 65, 67. Guide pin 15 is then smoothly withdrawn from hole 53 by backing picking tool 11 away from carrier 41.

The present invention has several advantages. The picker assembly allows not only for movement of the drive carriers within the library, but also allows for the system to issue diagnostic commands for automated or "call home" type analysis or problematic drives. The drives may be analyzed even if their backplane data connection is faulty or failing. These problematic drives can then be removed by the picker from the drawer slot and replaced with fully functional spare drives stored elsewhere within the library.

While the invention has been shown or described in only some of its forms, it should be apparent to those skilled in the art that it is not so limited, but is susceptible to various changes without departing from the scope of the invention.

What is claimed is:

1. A system for interfacing with and handling disk drives in an automated library having a drawer with a drawer connector, the apparatus comprising:
    a disk drive carrier having a disk drive mounted thereto, a backplane connector adapted to interconnect with the drawer connector, and an interface connector, wherein the disk drive carrier is adapted to be inserted into the drawer;
    a picking tool having securing means for securing the disk drive carrier to the picking tool, and interface means for interfacing with the interface connector of the disk drive carrier; and
    control means for controlling the picking tool and communicating information with the disk drive through both the backplane connector via the drawer connector, and through the interface connector via the interface means, such that the picking tool is adapted to remove the disk drive carrier from the drawer, transport the disk drive carrier, and place the disk drive carrier in the drawer, wherein the interface connector and the interface means utilize optical service interfaces utilizing matched pairs of LEDs and phototransistors.

2. The system of claim 1 wherein the disk drive carrier has a hole through which the interface means of the picking tool extends.

3. The system of claim 1 wherein the securing means of the picking tool is an electromagnet.

4. The system of claim 1 wherein the interface means is a tapered guide pin.

5. The system of claim 1 wherein the securing means provides horizontal support for the disk drive carrier, and the interface means provides vertical support for the disk drive carrier.

6. The system of claim 1 wherein the disk drive carrier is attracted to and repelled from the picking tool by reversibly actuating the securing means.

7. An automated disk drive library, comprising:
    a drawer having a drawer connector;
    a disk drive carrier for insertion into and removal from the drawer, the disk drive carrier having a disk drive mounted thereto, a backplane connector for interconnecting with the drawer connector, and an interface connector;
    a picking tool having securing means for securing the disk drive carrier to the picking tool, and interface means for interfacing with the interface connector of the disk drive carrier, wherein the disk drive carrier is attracted to and repelled from the picking tool by reversibly actuating the securing means; and
    control means for controlling the picking tool and communicating information with the disk drive through both the backplane connector via the drawer connector, and through the interface connector via the interface means, such that the picking tool removes the disk drive carrier from the drawer, transports the disk drive carrier, and places the disk drive carrier in the drawer, wherein the interface connector and the interface means utilize optical service interfaces having matched pairs of LEDs and phototransistors.

8. The automated disk drive library of claim 7 wherein the disk drive carrier has a tapered hole through which the interface means of the picking tool extends, and wherein the tapered hole and interface means are complementary in shape.

9. The automated disk drive library of claim 7 wherein the securing means of the picking tool utilizes electromagnets that selectively attract and repel the disk drive carrier via magnets secured to the disk drive carrier.

10. The automated disk drive library of claim 7 wherein the interface means is a tapered guide pin having a service interface on a distal end for interfacing with the interface connector of the disk drive carrier.

11. The automated disk drive library of claim 7 wherein the securing means provides horizontal support for the disk drive carrier, and the interface means provides vertical support for the disk drive carrier.

* * * * *